(12) United States Patent
Prince

(10) Patent No.: US 8,640,355 B2
(45) Date of Patent: Feb. 4, 2014

(54) CENTERING AND ALIGNMENT HAND TOOL

(76) Inventor: Richard E. Prince, Moultonborough, NH (US)

(*) Notice: Subject to any disclaimer, the term of this patent is extended or adjusted under 35 U.S.C. 154(b) by 210 days.

(21) Appl. No.: 13/348,911

(22) Filed: Jan. 12, 2012

(65) Prior Publication Data

US 2013/0180119 A1 Jul. 18, 2013

(51) Int. Cl.
*G01B 3/14* (2006.01)
*G01D 21/00* (2006.01)

(52) U.S. Cl.
USPC .................................. 33/613; 33/562; 33/644

(58) Field of Classification Search
USPC .................... 33/520, 562, 563, 613, 644, 645
See application file for complete search history.

(56) References Cited

U.S. PATENT DOCUMENTS

| 6,473,983 | B1* | 11/2002 | Gier | 33/613 |
| 2006/0265895 | A1* | 11/2006 | Daugherty | 33/613 |
| 2011/0083336 | A1* | 4/2011 | Pianetto | 33/613 |
| 2011/0219724 | A1* | 9/2011 | Davis | 33/613 |

* cited by examiner

*Primary Examiner* — G. Bradley Bennett
(74) *Attorney, Agent, or Firm* — Davis & Bujold, PLLC; Michael J. Bujold

(57) ABSTRACT

A hand tool comprising a longitudinal alignment edge which facilitates alignment of the hand tool with an edge of sheathing. A measurement plate extends normal to the alignment edge. At least one of the alignment edge and the measurement plate contain indicia indicating a centerline of the hand tool. The measurement plate has at least a first pair of parallel marking edges, that are equally spaced from the centerline, to facilitate marking of a pair of alignment lines for use in aligning a framing member between the alignment lines during installation of the sheathing.

20 Claims, 9 Drawing Sheets

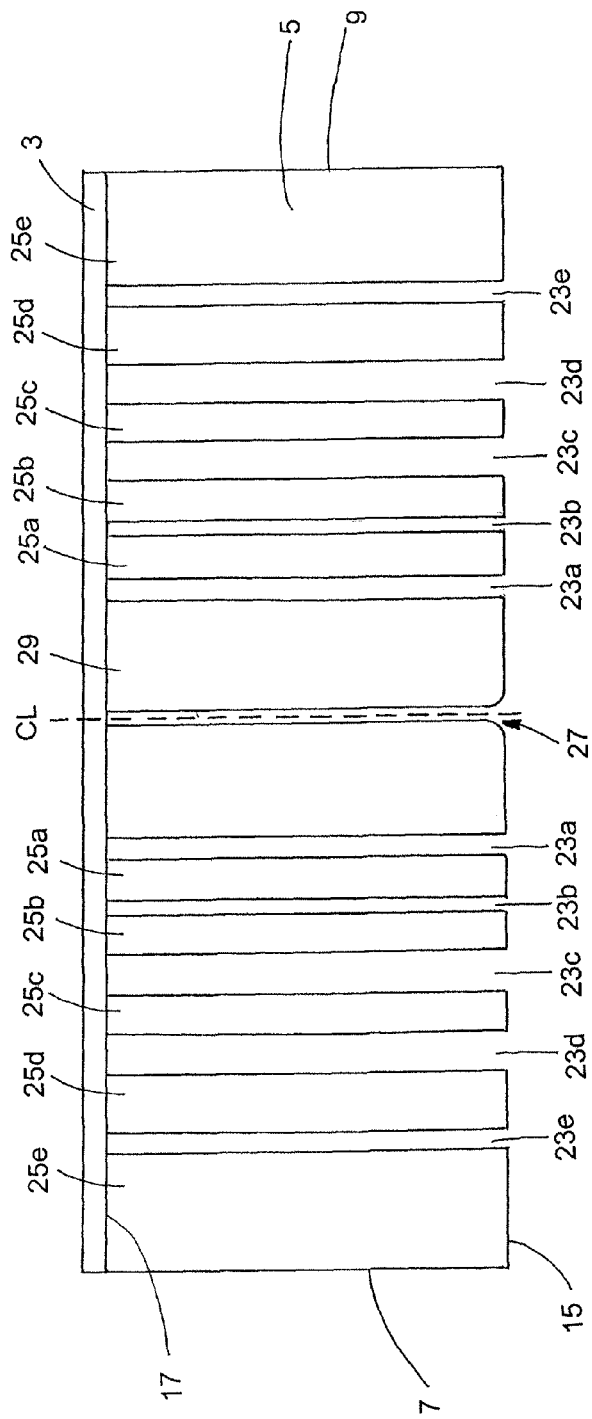
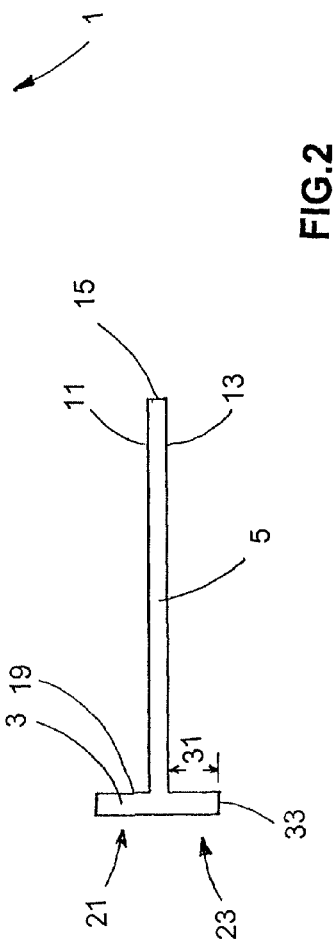
FIG. 1
FIG. 2

CENTERING AND ALIGNMENT HAND TOOL

FIELD OF THE INVENTION

The present invention relates generally to a hand tool for construction projects and more particularly to a hand tool which assists with centering and aligning building elements during fabrication of a structure.

BACKGROUND OF THE INVENTION

There are a large variety of tools that are currently known in the construction industry which are designed for specific applications. Framers and carpenters often utilize a number of measurement tools during the construction of residential, commercial and other buildings. As is well known in the trade, the construction of floors, exterior walls, interior load bearing walls, and roofs typically demand a great degree of measurement precision and accuracy during the layout of the structure frame which is typically formed by a plurality of interconnected beams, studs, rafters and/or joists, all of which are hereinafter referred to as framing members for the sake of convenience. These framing members are generally laid out in such a manner that they able to support a maximum amount of load including the weight of the structure itself as well as the weight that the structure is designed to support.

Floors, walls and roof frames are typically made torsionally stable by an exterior sheathing attached to the floors, exterior walls, roofs, etc., in a conventional manner, e.g., by nails, screws, etc. The spacing and alignment of the framing elements with respect to the sheathing and other adjacent framing members is crucial in the construction of floors, walls and roof frames having the desired structural integrity. For example, walls are typically framed such that the wall framing members are vertically aligned so as to be precisely square (form a 90 degree angle) with the floor and extend parallel with respect to one another. It is to be appreciated that such alignment of the framing members ensures the greatest amount of structural integrity for the floor, wall, roof, etc. In contrast, any misalignment of the framing members with respect to one another and/or the sheathing thereby reduces the overall structural integrity of the floor, wall, roof, etc., and thereby reduces the overall structural integrity of the resulting building or structure.

During typical construction, for example, the frame of a wall is formed on the floor of the structure by securing, i.e, nailing, the ends of the framing members to opposed bottom and top end plates. The end plates are premeasured and premarked so as to indicate the precise locations, along the top and the bottom end plates, at which the framing members will be nailed. After constructing the frame of a vertical wall for example, the fabricated frame, i.e., the top portion of the fabricated frame including the top end plate will be raised into a vertical orientation with the bottom end plate remaining on the floor and thereafter the constructed frame will be manipulated by the framers and/or the carpenters to ensure proper location of the bottom end plate on the floor as well as a vertical orientation thereof. The remaining side walls are then fabricated and secured in a conventional manner.

Once the constructed shell of the building or other structure frame is completed in a conventional manner, an exterior sheathing is then affixed to the shell of the building or other structure in a conventional manner to enclose the structure. To ensure proper alignment of the framing members with the sheathing, it is common to mark the desired nailing or other securing location(s), e.g., either a center point or both a center point and a pair of opposed markings equally spaced on either side of the center point, to the framing members along the upper and/or the bottom longitudinal edges of the sheathing. Before nailing the upper and/or the bottom longitudinal edges of the sheathing to the framing members, it is also customary to manipulate or adjust the relative position of the respective framing member with respect to the marked center point or the pair of opposed markings equally spaced on either side of the center point to compensate for any misalignment therebetween which often occurs. Once the desired manipulation or adjustment is achieved, the framer or the carpenter then secures or nails the sheathing to the framing members. This process is repeated for each piece of sheathing to be attached to the structure in order to tack the sheathings to the structure. Lastly, as is conventional in the art, a plurality of chalk lines or other vertical lines are drawn by the framer or the carpenter to indicate the additional vertical locations along which each piece of sheathing is to be attached or nailed to the associated framing members.

Currently, there are a number of tools in use today for measuring and marking the center points along the first and the second opposed longitudinal edges of the sheathing, including tape measures and framing squares, but such techniques are generally time consuming and require mathematical analysis and thus are prone to error. For example, according to the prior art, the center points are first marked along the first and the second opposed longitudinal edges of the sheathing at a spacing of 16 inches on center, 24 inches on center, etc., as dictated by the structure. Once the center points are marked along the first and the second opposed longitudinal edges of the sheathing, the least time consuming way to utilize such center point marks is the so called "eyeballing" method. According to this method, the framer or the carpenter merely estimates the location where the center of the associated framing member is "aligned" with the center point mark on the sheathing and then the framer or the carpenter secures or nails the sheathing directly to the framing member. Although this "eyeballing" method is arguably quick and easy, often times it results in some misalignment of the framing members with respect to other adjacent framing members as well as with respect to the sheathing. As noted above, any misalignment of the framing members with respect to one another and/or the sheathing, in turn, leads to a reduction in fabricated wall strength and thereby a decrease in the overall structural integrity of the structure or building.

A more precise method, also used by framers or carpenters, to properly align the framing members with the respective center point marks along the first and the second opposed longitudinal edges of the sheathing is to provide a pair of width marks or alignment lines equally spaced on either side of the center point marks. Each pair of width marks or alignment lines, on the sheathing, indicate the width of the frame member to which the sheathing is being attached and thus provide a more precise mechanism by which the framer or the carpenter may align or center the associated framing member between the pair of width marks or alignment lines (see FIGS. 11 and 12), on either side of the center point mark, before the framer or the carpenter eventually secures or nails the sheathing directly to the framing member.

Although utilization of the pair of width marks or alignment lines, on the sheathing, to indicate the width of the frame member to which the sheathing is being attached is much more accurate and reliable and thereby results in a frame which has greater strength and structural integrity, the marking of the additional pair of width marks or alignment lines is also a more tedious and time consuming procedure than the basic eyeballing method. Moreover, some times mistakes are made when determining the "half width" of the framing member, especially when there are a number of differently sized framing members currently being used for the construction of the wall(s), floor(s), roof(s), etc. That is, the framer or the carpenter must first mark the respective center point marks along the first and the second opposed longitudinal edges of the sheathing. Next, the framer or the carpenter must then determine and mark two half width marks on either side of the center point marks. For example, if the center point marks are marked 16 inches on center and the framing members are 2×6×8, then the half width of the framing member is ¾ of an inch (i.e., the planed width of the 2×6×8 framing member is 1½ inches). Accordingly, the framer or the carpenter will also according make marks at 15¼ and 16¾ inches, 31¼ and 32¾ inches, 47¼ and 48¾ inches, etc., along each of the first and the second opposed longitudinal edges of the sheathing. Finally, the framer or the carpenter may utilize a framing square to extend the length of each of the additional width marks to make them readily visible prior to installing the sheathing.

SUMMARY OF THE INVENTION

Wherefore, it is an object of the present invention to overcome the above mentioned shortcomings and drawbacks associated with the conventional tools and methods.

Another object of the present invention is to provide a hand tool which facilitates quick, easy and accurate marking of the pair of width marks or alignment lines on the sheathing, following the inscription of the center point mark, so that the sheathing may be installed using the pair of width marks or alignment lines to facilitate alignment of the sheathing with the framing members and thereby facilitate accurate parallel alignment of beams, framing members, rafters, joists, etc., with respect to each other and the associated sheathing, sub-roofs, sub-floors, etc.

A further object of the present invention to provide a hand tool that is easy to utilize and does not require elaborate calculation of measurements when marking a pair of width marks or alignment lines on either side of the center point mark to assist with aligning the desired beams, framing members, rafters, joists, studs, etc., with the associated sheathing regardless of the size or width of the beams, framing members, rafters, joists, studs, etc.

Another object of the present invention is to provide a hand tool that is relatively compact and lightweight and thus can be easily carried within a tool belt of the framer, the carpenter or other construction personnel.

The hand tool according to the invention should be simple to use and should enable fast and accurate measuring and marking of points where side markers should be scribed thus enabling quick and proper alignment of beams, framing members, rafters and joists.

The present invention also relates to a hand tool comprising a longitudinal alignment edge for facilitating alignment of the hand tool with an edge of sheathing. A measurement plate extends normal to the alignment edge and at least one of the alignment edge and the measurement plate contain indicia indicating a centerline of the hand too. The measurement plate has at least a first pair of parallel marking edges that are equally spaced from the centerline which facilitate marking of a pair of alignment lines to be used in aligning a framing member between the alignment lines during installation of the sheathing.

BRIEF DESCRIPTION OF THE DRAWINGS

The invention will now be described, by way of example, with reference to the accompanying drawings in which:

FIG. 1 is a top plan view of a hand tool according to the invention;

FIG. 2 is a side view of the hand tool according to FIG. 1;

DETAILED DESCRIPTION OF THE INVENTION

Figure 3:
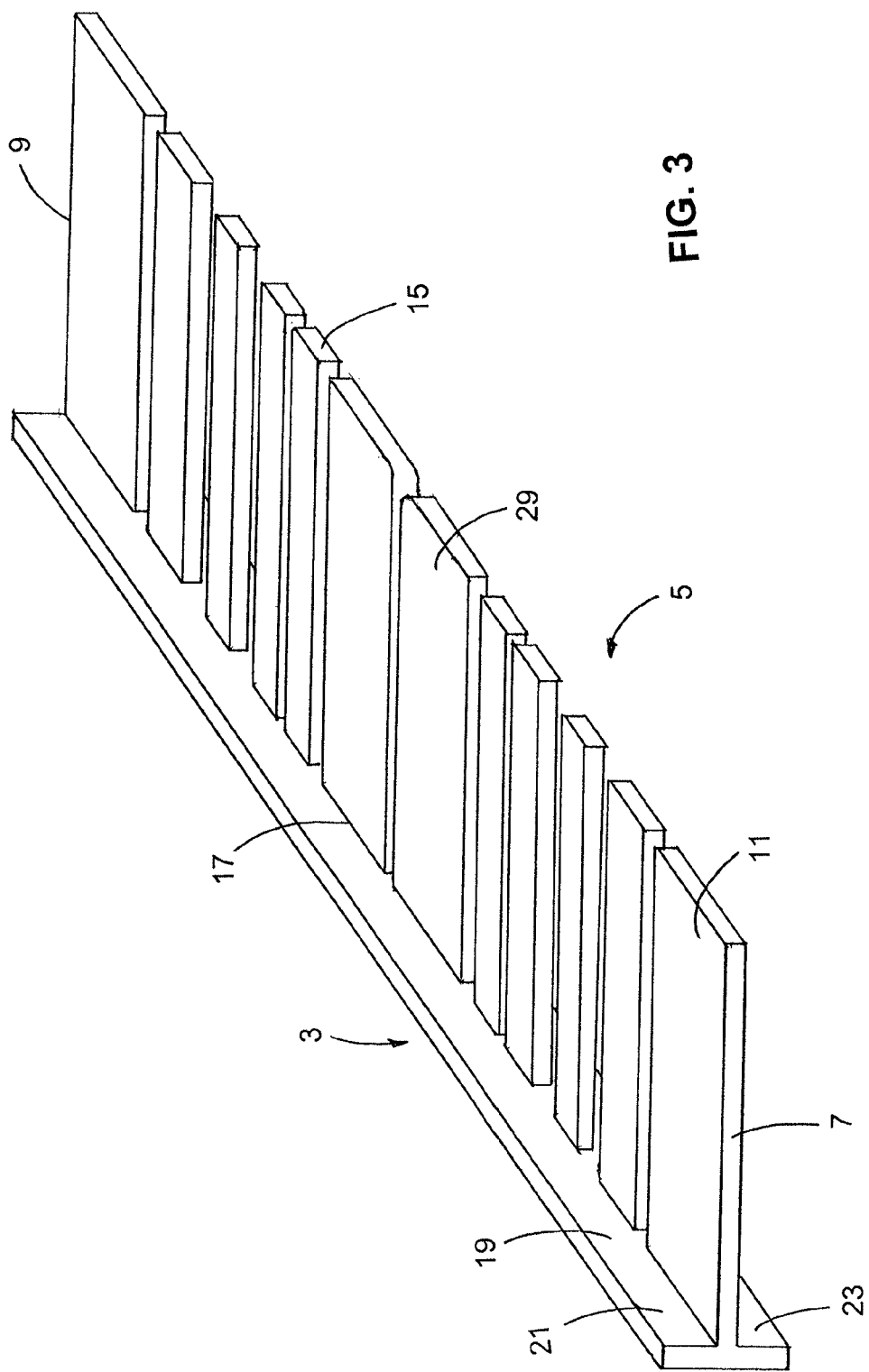
FIG. 3 is an isometric view of the hand tool of FIG. 1.

Turning now to FIGS. 1-3, a brief description concerning the various components of the present invention will now be briefly discussed. As can be seen in this embodiment, the hand tool 1 generally comprises an elongate rectangular alignment edge 3 and an elongate rectangular measurement plate 5. The measurement plate 5 is planar and comprises first and second longitudinal edges 7, 9, opposed top and bottom surfaces 11, 13 and front and back edges 15, 17. The first longitudinal edge 7 of the measurement plate 5 forms a left longitudinal edge of the hand tool 1 while the second longitudinal edge 9, extending opposite to the first longitudinal edge 7, forms a right longitudinal edge of the hand tool 1. The back edge 17 of the measurement plate 5 is connected integrally to or formed with and extends perpendicularly from a front surface 19 of the alignment edge 3 such that the hand tool 1 has a T-shaped transverse cross sectional shape or side profile (see FIG. 2). The alignment edge 3 is a solid planar plate and, as can be seen in FIG. 2, is generally divided, by the measurement plate 5 extending normal therefrom, into an upper portion 21 and a lower portion 23.

The measurement plate 5 comprises a plurality of parallel slots 23a-23e that extend from the front edge 15 to the back edge 17 and divide the measurement plate 5 into a plurality of separate spaced apart fingers or tabs 25a-25e. A centerline slot 27 is formed in the measurement plate 5, midway between the left and the right longitudinal edges 7, 9. The centerline slot 27 defines a centerline CL that extends from the front surface 19 of the alignment edge 3 to the front edge 15 of the measurement plate 5, and this centerline CL divides the hand tool 1 into two symmetrical halves with each symmetrical half being a mirror image of the other. Since the two symmetrical halves of the measurement plate 5 are a mirror image of one another, the respective slots 23a-23e and the respective tabs 25a-25e are also located at precisely the same distance from the centerline CL, but on opposite sides thereof, and are referred to, in the following description, as slot pairs 23a-23e and tab pairs 25a-25e.

As can be seen in FIG. 1, starting from the centerline slot 27 and moving toward the right and the left longitudinal edges 7, 9, the measurement plate 5 includes a first pair of central tabs 29 with the centerline slot 27 being located and extending therebetween. A first slot pair 23a is located on each side of the pair of central tabs 29 remote from the centerline slot 27. The measurement plate 5 further sequentially comprises a second tab pair 25a, a second slot pair 23b, a third tab pair 25b, a third slot pair 23c, a fourth tab pair 25c, a fourth slot pair 23d, a fifth tab pair 25d, a fifth slot pair 23e and a sixth tab pair 25e. Each of the tab pairs 25a-25e has a longitudinal inner edge and a longitudinal outer edge with the longitudinal inner edges of the respective tab pairs 25a-25e being the edges that are located closest to the centerline CL and the longitudinal outer edges being the edges that are located furthest away from the centerline CL. The longitudinal inner edges of the central tab 29 define the centerline slot 27 while the longitudinal outer edges of the fifth tab pair 25e form the left and the right longitudinal edges 7, 9 of the hand tool 1.

The inner and outer edges of the respective tab pairs 25a-25e are used as templates or guides and facilitate quick and easy marking of the pair of width marks or alignment lines, on the sheathing, to indicate the width of the frame member as will be further discussed below.

Figure 1A:
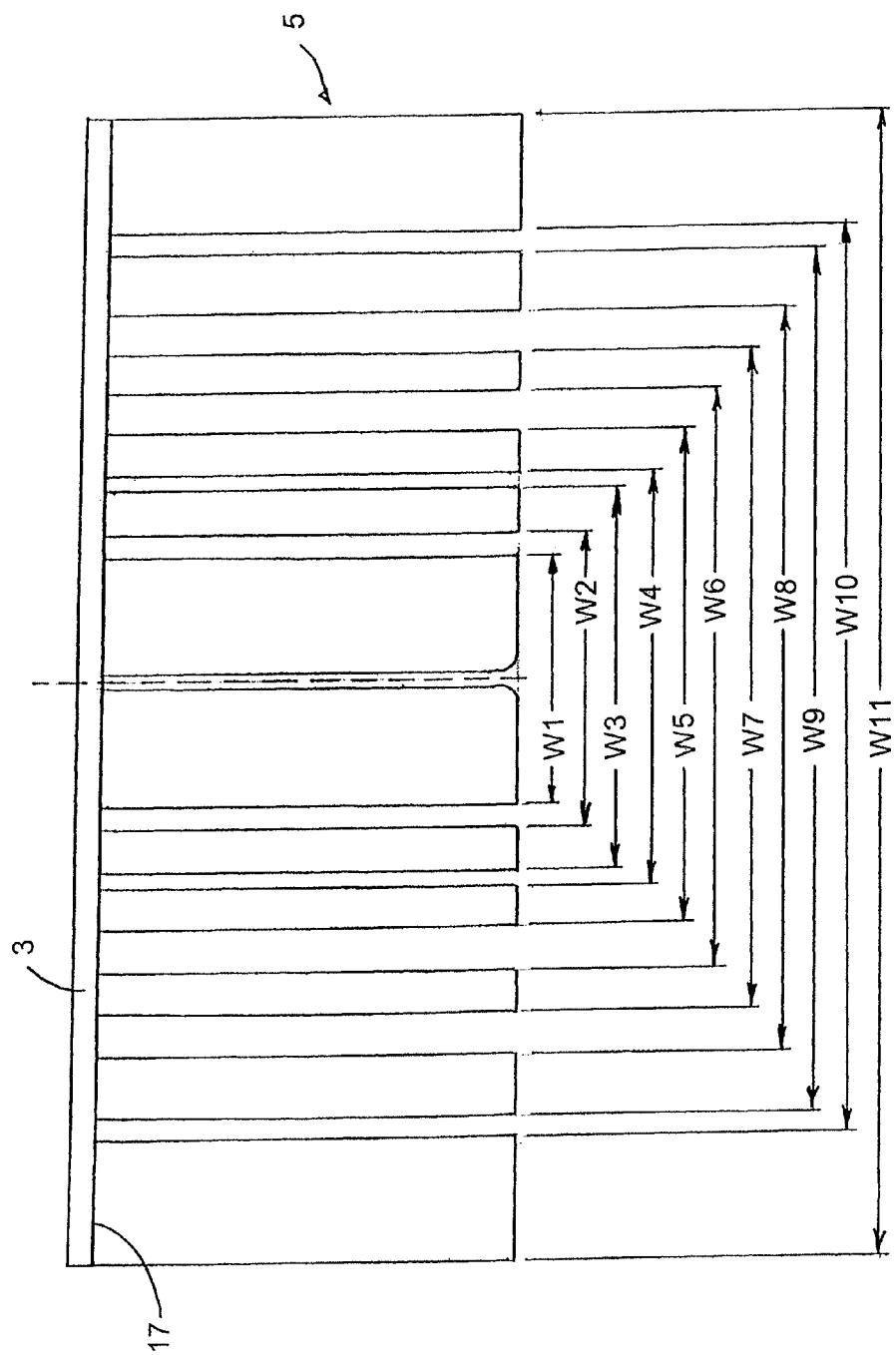
FIG. 1A is a top plan view of the hand tool according to FIG. 1 which identifies distances between corresponding edges of tabs.

As generally illustrated in FIG. 1A, the spacing or distance between the inner and outer edges of the respective tab pairs 25a-25e correspond to the width dimensions of common framing members. That is the hand tool 1 is designed such that the spacing or distance W1 between the longitudinal outer edges of the central tab 29 is 1½ inches.

The spacing or distance W2 between the longitudinal inner edges of the first tab pair 25a is 1¾ inches, while the spacing or distance W3 between the longitudinal outer edges of the first tab pair 25a is 2⁵⁄₁₆ inches.

The spacing or distance W4 between the longitudinal inner edges of the second tab pair 25b is 2½ inches, while the spacing or distance W5 between the longitudinal outer edges of the second tab pair 25b is 3 inches.

The spacing or distance W6 between the longitudinal inner edges of the third tab pair 25c is 3½ inches, while the spacing or distance W7 between the longitudinal outer edges of the third tab pair 25c is 4 inches.

The spacing or distance W8 between the longitudinal inner edges of the fourth tab pair 25d is 4½ inches, while the spacing or distance W9 between the longitudinal outer edges of the fourth tab pair 25d is 5¼ inches.

The spacing or distance W10 between the longitudinal inner edges of the fifth tab pair 25e is 5½ inches, while the spacing or distance W11 between the left and right longitudinal edges 7, 9 of the hand tool 1 is 7 inches.

The hand tool 1 comprises indicia located along the top face 11 of the measurement plate 5 which relate to the conventional widths of the framing members 37 which are typically used during the construction of a wall, floor, roof, etc. From the longitudinal distances indicated above, it is clear to see that the hand tool 1 can be rapidly and efficiently utilized, in the manner described below, during construction of a wall, floor, roof, etc., to fabricate a desired construction covering material, e.g., a sheathing, with a variety of different sized load bearing elements, e.g., framing members. For example the hand tool 1 can be used to mark the pair of width marks or alignment lines when building walls with framing members having a thickness or width of 1½, 1¾, 2⁵⁄₁₆, 2½, 3, 3½, 4, 4½, 5¼, 5½, and 7 inches.

Figure 4:
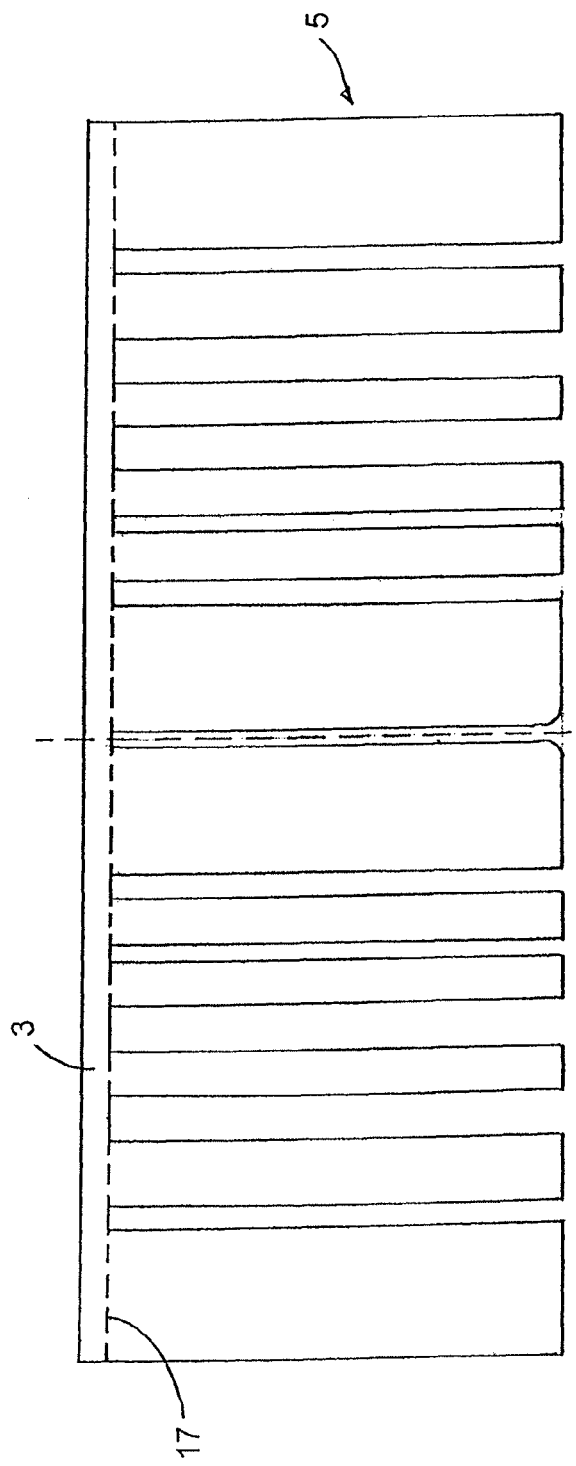
FIG. 4 is top plan view of another embodiment of the hand tool according to the invention.
Figure 5:
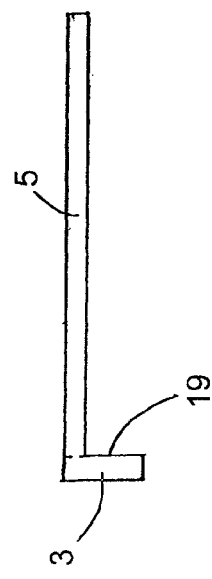
FIG. 5 is a side view of the hand tool of FIG. 4.

FIGS. 4 and 5 illustrate another embodiment of the invention which is similar to the above described embodiment. As such, like elements illustrated in these figures are designated throughout with like numerals. Further as this embodiment of the hand tool 1 is very similar to the preceding embodiment, only the differences of this embodiment and the previous embodiment will be discussed below.

The hand tool 1 of this embodiment comprises both a measurement plate 5 and an alignment edge 3, like the preceding embodiment, however the back edge 17 of the measurement plate 5 is integrally connected to and extends perpendicularly from an upper side of the front surface 19 of the alignment edge 3. In other words, the alignment edge 3 of this embodiment does not include an upper portion and as such the hand tool 1 generally has a L-shaped transverse cross sectional shape or side profile as best seen in FIG. 5.

Figure 6:
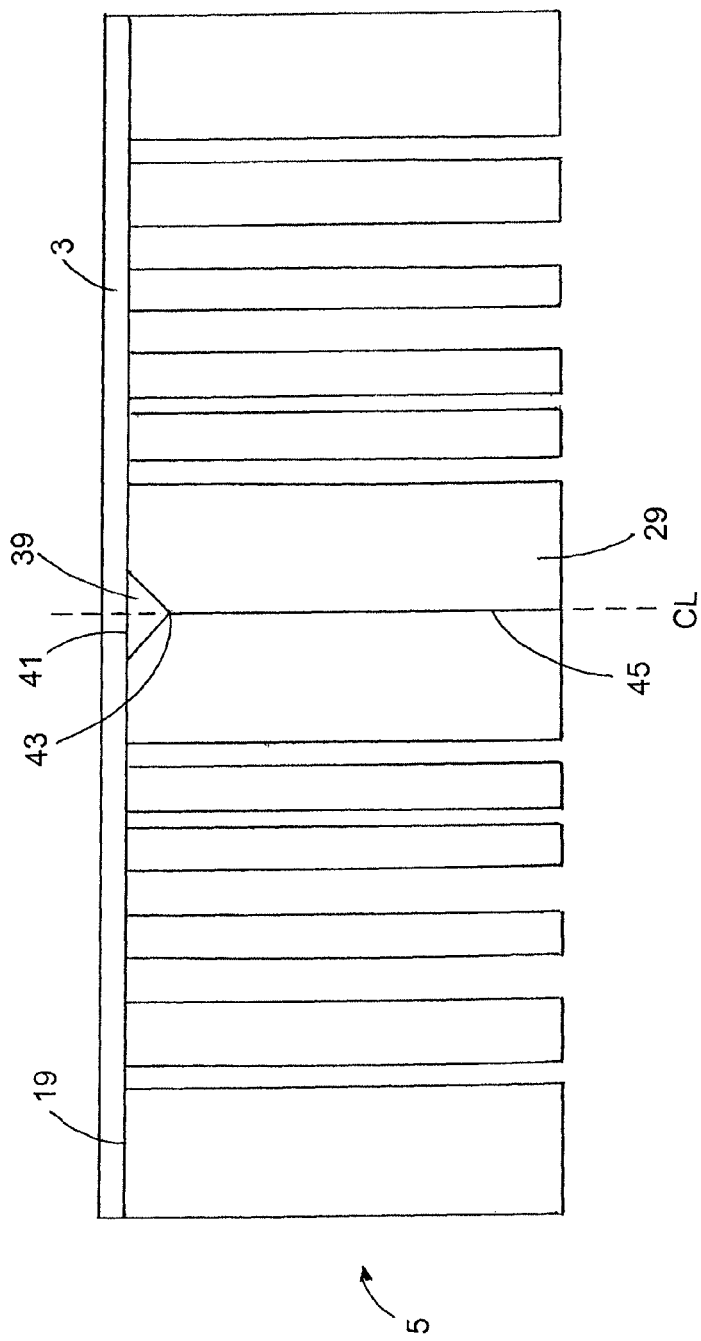
FIG. 6 is top plan view of a further embodiment of the hand tool according to the invention.
Figure 7:
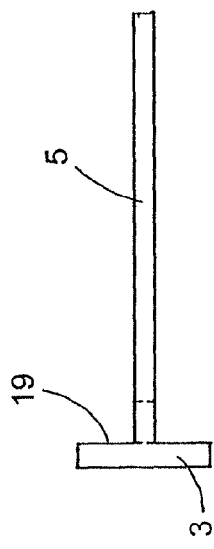
FIG. 7 is a side view of the hand tool of FIG. 6.

The hand tool 1, according to the embodiment illustrated in FIGS. 6 and 7, is similar to the hand tool 1 described in relation to FIGS. 1-3 except that this embodiment does not include a centerline slot 27. Instead the alignment edge 3 and/or the measurement plate 5 of the hand tool 1 is provided with a V-shaped notch or triangular shaped aperture or hole 39 which is sized to facilitate easy of viewing and centering of one of the center point marks provided along the first and the second opposed longitudinal edges of the sheathing. As illustrated in the top plan view of FIG. 6, a base 41 of the triangular shaped aperture or hole 39 is coincident with the front surface 19 of the alignment edge 3 while an apex 43 of the triangular shaped aperture 39 is precisely aligned and coincident with the centerline CL of the hand tool 1. The central tab 29 further comprises a centerline indicia 45 to accentuate and highlight the centerline of the hand tool 1 and aid with proper positioning thereof. It is to be appreciated that the shape and form of the notch or aperture 39 is arbitrary just as long as the aperture or hole enables ease of viewing of the longitudinal edge of the sheet of plywood and the center point marks inscribed thereon.

Figure 6C:
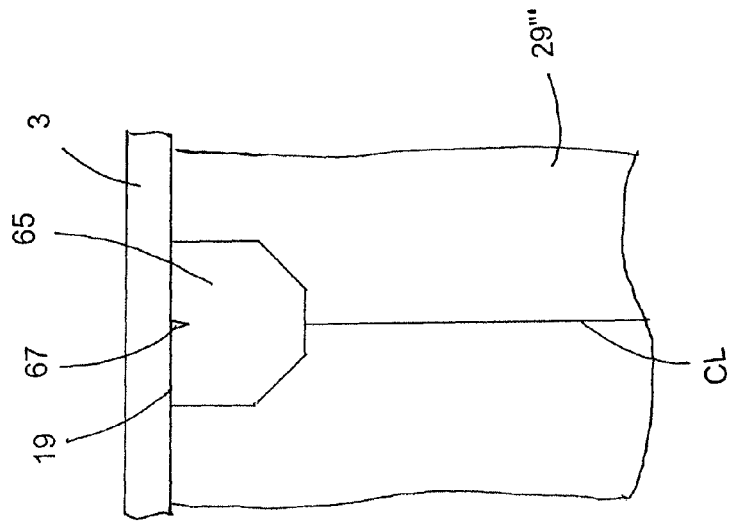
FIG. 6C is a close up top plan view of a portion of a hand tool according to the invention showing a further means for viewing center point marks.
Figure 6B:
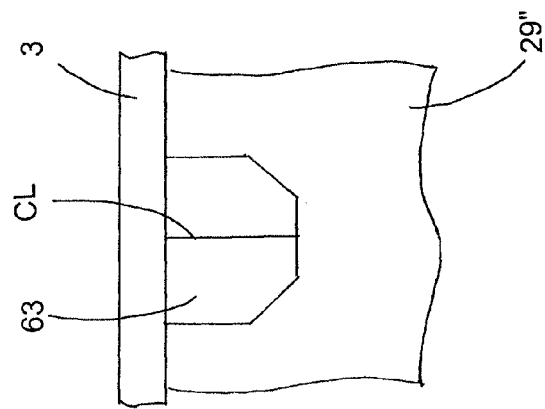
FIG. 6B is a close up top plan view of a portion of a hand tool according to the invention showing another means for viewing center point marks.
Figure 6A:
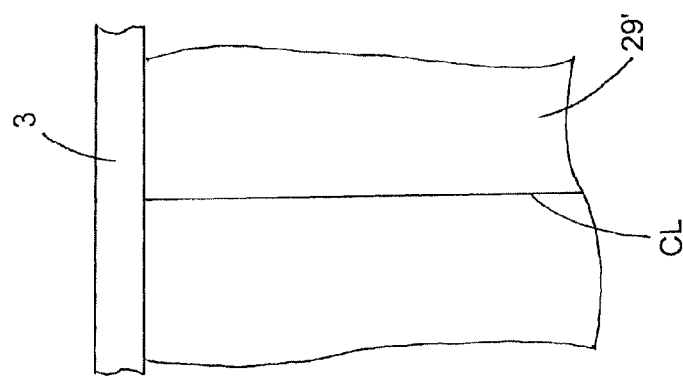
FIG. 6A is a close up top plan view of a portion of a hand tool according to the invention showing one means for viewing center point marks.

With regard to this aspect, FIGS. 6A, 6B and 6C show close up views of the portion of the hand tool 1 in the area of the centerline CL. These illustrate different means for viewing the longitudinal edge of the sheet of plywood and the center point marks inscribed thereon. At least the central tab 29' shown in FIG. 6A is made of a transparent material thereby making it possible to view the sheet of plywood and the center point marks inscribed thereon. In this case the centerline CL is inscribed on the central tab 29' to facilitate accurate alignment of the hand tool 1 with the center point marks inscribed along the sheet of plywood. The embodiment shown in FIG. 6B is similar to the embodiment shown in FIG. 6A, except that only a limited portion of the central tab 29" is transparent. The transparent portion of the central tab 29" forms a window 63. The centerline CL is inscribed in the window 63 and facilitates accurate alignment of the hand tool 1 with the center point marks inscribed along the sheet of plywood. The embodiment show in FIG. 6C is different from the above discussed embodiments in that the central tab 29′′′ comprises an aperture or hole 39. To properly align the hand tool 1 shown in FIG. 6C, the front surface 19 of the alignment edge 3 includes a sight 67 that projects from the front surface 19 of the alignment edge 3. The sight 67 is positioned such that a line extending from the sight 67 at a 90 degree angle from the alignment edge 3 is collinear with the centerline CL inscribed on the central tab 29′′′.

Figure 8:
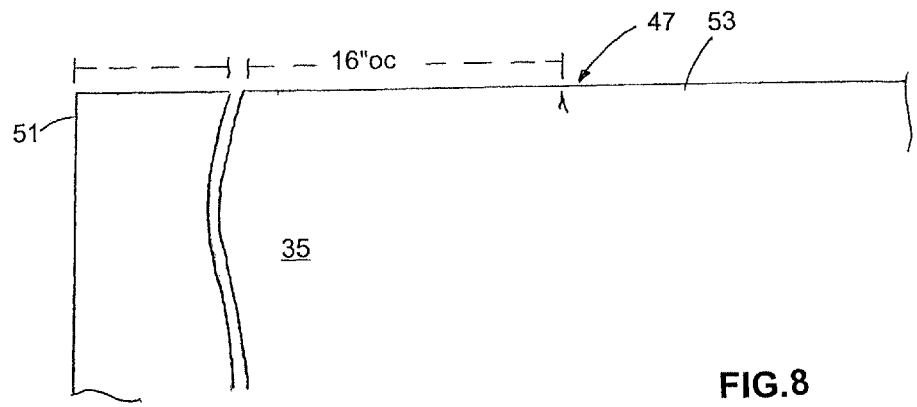
FIG. 8 is a diagrammatic view of a corner portion of a sheet of plywood sheathing showing a center point marking thereon.

With reference now to FIGS. 8-12, the use of the hand tool 1, according to the present invention, in relation to the construction of a wall, i.e., alignment of the framing members of the wall frame prior to securing or nailing the sheathing to the wall frame, will now be described. As discussed above, the first and second opposed longitudinal edges of a sheet of plywood 35, i.e., the sheathing, are first marked, typically by using a conventional tape measure, with the center point marks 47 to indicate the proper center point locations for the framing members with respect to the sheet of plywood 35, i.e., the sheathing. For example, if the framing members are located 16 inches on center, the carpenter or the framer extends a tape measure along the entire longitudinal length of the first longitudinal edge of the sheet of plywood 35 and marks the same with a center point mark 47 every 16 inches. That is, the carpenter or the framer will use a pencil or an ink marker to place a center point mark 47 every 16 inches along the longitudinal edge 53 of the sheet of plywood 35. The carpenter or the framer then extends the tape measure along the entire longitudinal length of the second longitudinal edge of the sheet of plywood 35 and marks the same with a center point mark 47 every 16 inches. FIG. 8 shows a portion of the sheet of plywood 35 and a single inverted V shaped center point mark 47 thereon which is 16 inches from a first traverse edge 51 of the sheet of plywood 35.

Figure 9:
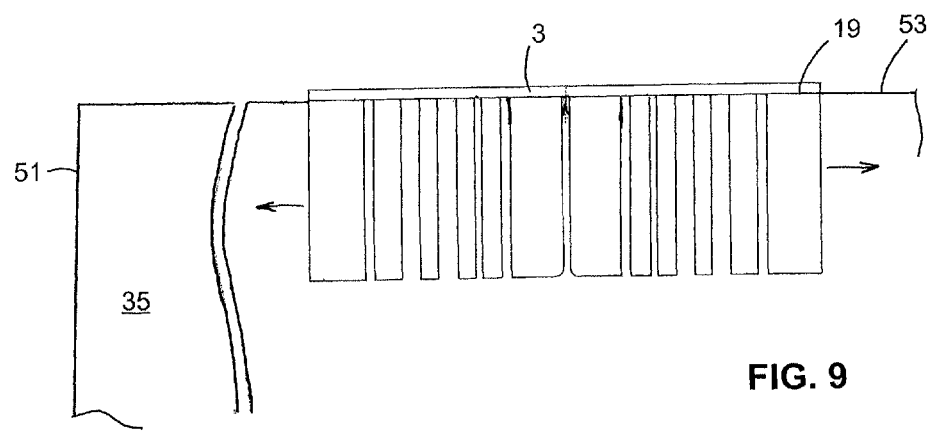
FIG. 9 is a plan view of the corner portion of the sheet of plywood sheathing according to FIG. 8 with the hand tool aligned with the center point marking.
Figure 9A:
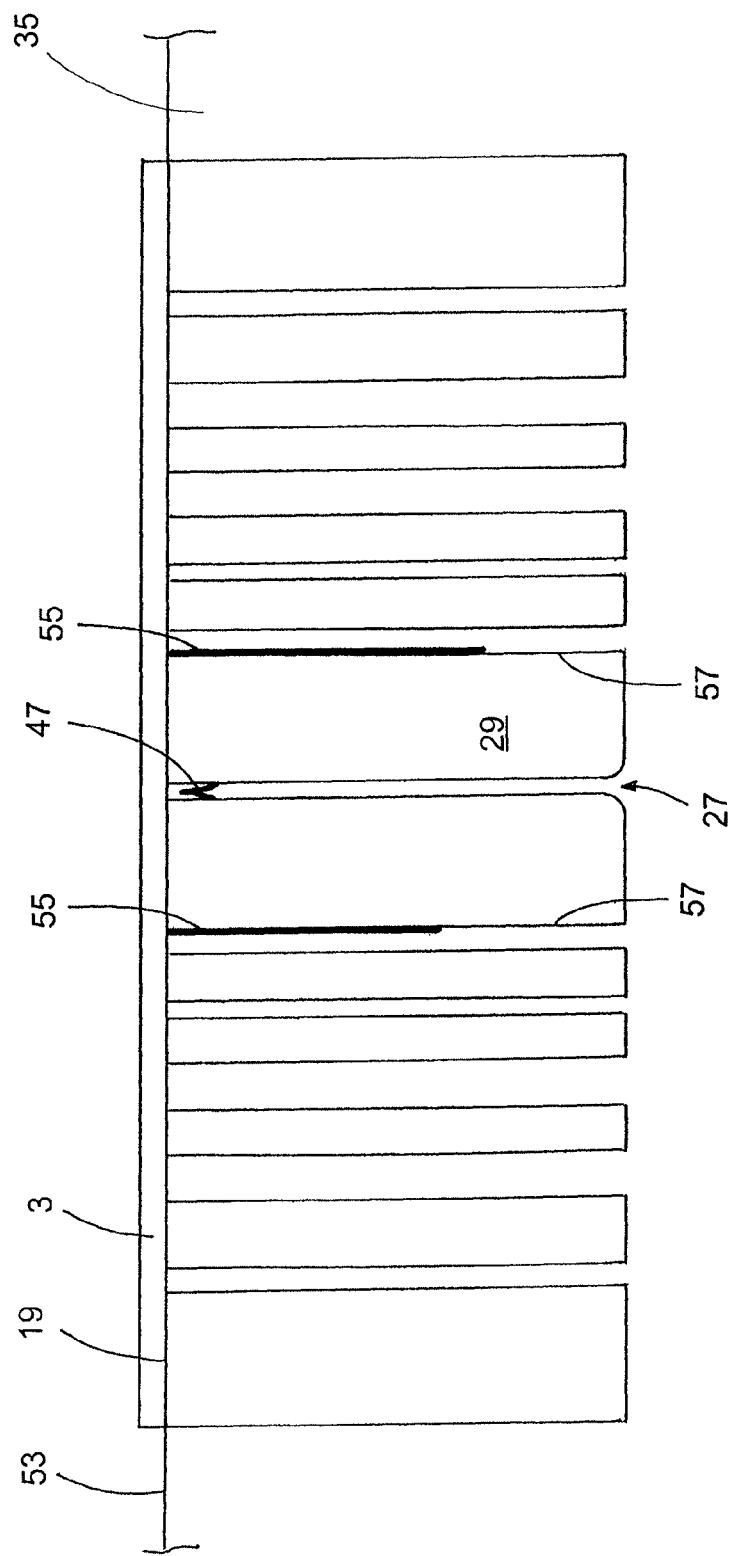
FIG. 9A is an exploded view of the hand tool aligned with the center point marking.

Next, as shown in FIGS. 9 and 9A, the hand tool 1 is then placed along the longitudinal edge 53 of the sheet of plywood 35 such that the front surface 19 of the alignment edge 3 lies flat or flush against the longitudinal edge 53. The hand tool 1 is then slid along the longitudinal edge 53 of the sheet of plywood 35, as indicated by the arrows in FIG. 9, until the centerline CL of the hand tool 1 is precisely aligned with one of the center point marks 47 located along the longitudinal edge 53 of the sheet of plywood 35. That is, the hand tool 1 is slide along the longitudinal edge 53 until one of the center point marks 47 is precisely aligned with the centerline slot 27 or the triangular shaped aperture 39. Once the hand tool 1 is properly aligned with that center point mark 47, the framer or the carpenter then draws a pair of alignment lines 55 along the appropriate inner or outer longitudinal edges of the desired tab pairs.

Figure 10:
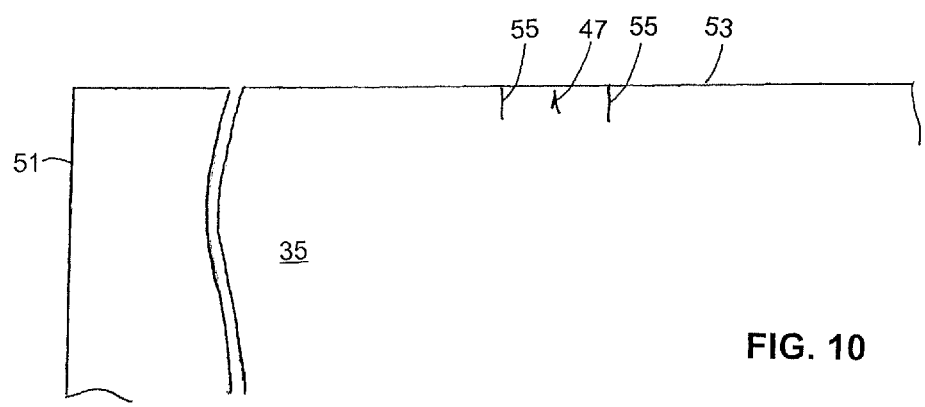
FIG. 10 is a plan view of the corner portion of the sheet of plywood sheathing according to FIG. 8 with the center point marking and alignment lines drawn by use of the hand tool.

In the case illustrated in FIGS. 9 and 9A, the frame is being constructed with 2×6×8 inch framing members which have a planed thickness or width of 1½ inches. In view of this thickness for the framing members, the framer or the carpenter will utilize the longitudinal inner edges 57 of the central tab 29 to draw pair of frame member width marks or alignment lines 55. FIG. 9A shows the correct positioning of the hand tool 1 as well as the two marks inscribed along the longitudinal inner edges 57 of the central tab 29 while FIG. 10 illustrates the center point mark 47 and the associated alignment lines 55 following removal of the hand tool 1 from the longitudinal edge 53 of the sheet of plywood 35.

The hand tool 1 is then slid or moved along the longitudinal edge 53 of the sheet of plywood 35 to the next center point marking 47 where the above process is repeated with the framer or the carpenter drawing another pair of width marks or alignment lines 55 utilizing the longitudinal inner edges 57 of the central tab 29. Once all of the center point marks 47 drawn along the longitudinal edge 53 of the sheet of plywood 35 are suitably marked with a pair of alignment lines 55, the framer or the carpenter with then repeat the above process along the second opposed longitudinal edge 53 of the sheet of plywood 35 so that both longitudinal edges 53 of the sheet of plywood 35 are suitably marked.

Figure 11:
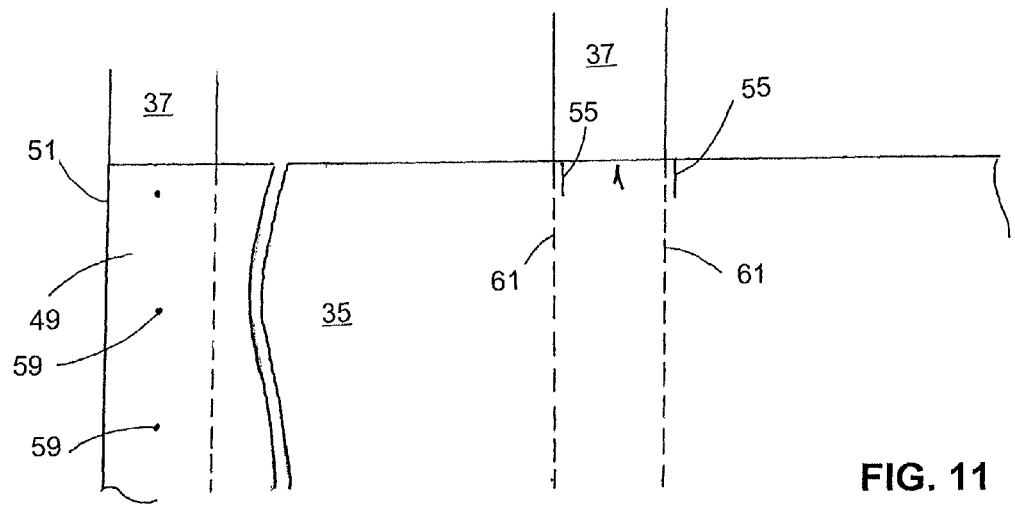
FIG. 11 is a plan view of the corner portion of the sheet of plywood sheathing according to FIG. 8 with one side secured to an outside framing member of a wall frame and a misaligned adjacent framing member.
Figure 12:
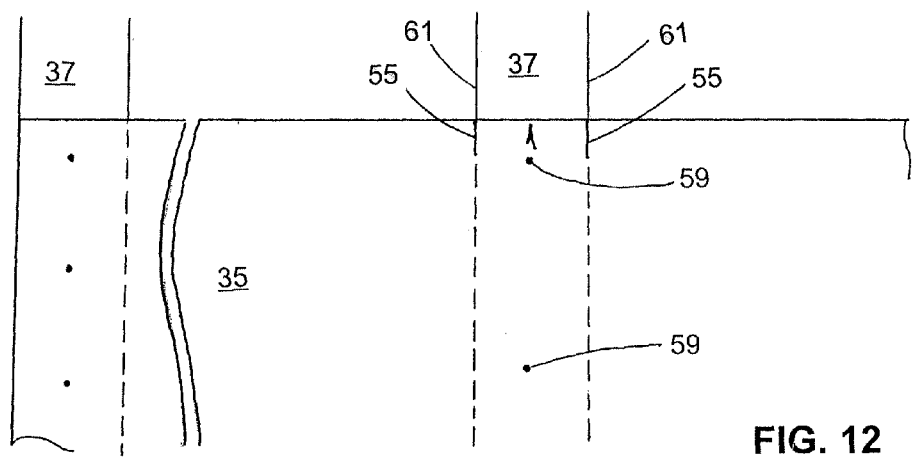
FIG. 12 is a plan view of the corner portion of the sheet of plywood sheathing according to FIG. 8 with one side secured to an outside framing member of a wall frame and the adjacent framing member properly aligned and secured to the sheet of plywood sheathing.

After the sheet of plywood 35 is marked as indicated above, the sheet of plywood 35 is then nailed or tacked at a few locations to the frame. In the case shown in FIG. 11, the traverse edge 51 of the sheet of plywood 35 is aligned along a center or side of a framing member 37 located at one side of the wall frame and a top portion of the sheet of plywood 35 is secured thereto with a conventional nail, screw or some other fastener 59. As shown in FIG. 11, although the left most framing member 37 is properly aligned with the side longitudinal edge 51 of the sheet of plywood 35, the adjacent framing member 37 is slightly misaligned, i.e., opposed surfaces 61 of the adjacent framing member 37 are not precisely aligned with the alignment lines 55 inscribed along the longitudinal edge of the sheet of plywood 35. Such misalignment can be the result of a framing member previously being exposed to moisture and then warping as it dried or perhaps the framing member was bowed at the time of delivery.

Regardless of the cause of the misalignment or any inherent curvature contained in the framing member, the framing member 37 is manually biased by the framer or the carpenter, to the right in this illustration, so that the opposed surfaces 61 of the framing member 37 are thus properly aligned with the alignment lines 55 inscribed along the longitudinal edge of the sheet of plywood 35. Once the framing member 37 is manipulated such that the framing member surfaces 61 are aligned with the alignment lines 55, the sheet of plywood 35 is then secured to the framing member 37 with a conventional nail, screw or some other fastener 59. Lastly, as is conventional in the art, a plurality of chalk lines or other vertical lines are drawn by the framer or the carpenter to indicate the additional vertical locations along which each piece of sheathing is to be attached or nailed to the associated framing members.

It is to be understood that some of the dimensions of the hand tool 1 are not critical to the proper use of the hand tool 1. However, the distance 31 from the bottom face 13 of the measurement plate 5 to a lower surface 33 of the alignment edge 3 generally depends on the thickness of the sheet of plywood 35, e.g., sheathing being fixed or nailed to the frame. If the distance 31 is greater than the width of the sheet 35, the lower surface 33 of the alignment edge 3 will abut the frame member 37 and the bottom face 13 of the measurement plate 5 will not adequately lay on the surface of the sheet 35. It is preferable that the distance 31 from the bottom face 13 of the measurement plate 5 to the lower surface 33 of the alignment edge 3 is within the range of ½ inch to ¹⁄₁₆ inch, more preferably the distance 31 from, the bottom face 13 of the measurement plate 5 to the lower surface 33 of the alignment edge 3 is within the range of ⅜ inch to ⅛ inch, and most preferably the distance 31 from the bottom face 13 of the measurement plate 5 to the lower surface 33 of the alignment edge 3 is approximately ¼ inch.

The distance between the top face 11 of the measurement plate 5 and an upper surface of the alignment edge 3 is generally arbitrary, however it is beneficial if this distance corresponds to the distance 31 recited above with regard to the distance from the bottom face 13 of the measurement plate 5 to the lower surface 33 of the alignment edge 3. If the these two distances are roughly the same it would be possible that either face 11, 13 of the measurement plate 5 could be used in the manner described below.

The distance between the front and back edges 15, 17 of the measurement plate 5 is preferably within the range of 1 inch and 5 inches. More preferably the distance between the front and back edges 15, 17 of the measurement plate 5 is within the range of 2 inches and 4 inches. Most preferably the distance between the front and back edges 15, 17 of the measurement plate 5 is approximately 3 inches. This distance depends on the desired sturdiness of the hand tool 1, i.e., the longer the distance between the front and back edges 15, 17 of the measurement plate 5, the easier it would be to inadvertently bend or break one or more tab of the tab pairs 25a-25e.

Furthermore, it is to be recognized that the hand tool 1 can be manufactured from a number of different materials. For example, the hand tool 1 can be formed from two metallic components that are couple together by welding or the like. Alternatively, the hand tool 1 can simply be a metallic plate that is appropriately bent so as to form the guide and measurement plates 3, 5 (see FIGS. 4 and 5 for example). The hand tool 1 may also be formed from an extruded piece of metal or plastic. The thickness of the guide and measurement plates 3, 5 depends on the desired sturdiness of the hand tool 1, bearing mind that the use of thicker metal plates increases overall the weight of the hand tool 1. As the process of making or forming the hand tool 1 would be obvious to one skilled in the art of tool design, a further description concerning the same will not be provided.

With regard to the above description and appended drawings, it is to be appreciated that only the terms "consisting of" and "consisting only of" are to be construed in the limitative sense while of all other terms are to be construed as being open-ended and given the broadest possible meaning.

Since certain changes may be made in the above described hand tool and method of using the hand tool, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. A hand tool comprising:
   a longitudinal alignment edge for facilitating alignment of the hand tool with an edge of a sheathing,
   a measurement plate extending normal to the alignment edge,
   at least one of the alignment edge and the measurement plate containing indicia indicating a centerline of the hand tool, and
   the measurement plate having at least a first pair of parallel marking edges, equally spaced from the centerline, to facilitate marking of a pair of alignment lines for use in aligning a framing member between the alignment lines during installation of the sheathing.

2. The hand tool according to claim 1, wherein the hand tool has a plurality of pairs of parallel marking edges, and each pair of parallel marking edges is equally spaced from the centerline to facilitate marking of a pair of alignment lines on the sheathing.

3. The hand tool according to claim 1, wherein the centerline indicia is coincident with a centerline slot which extends from the alignment edge to a remote end of the measurement plate centered between a first tab pair.

4. The hand tool according to claim 1, wherein the centerline indicia comprises one of a centerline mark, a V-shaped notch or a triangular shaped aperture which indicates a centerline of the tool that bisects the hand tool into two symmetrical portions.

5. The hand tool according to claim 3, wherein first pair of parallel marking edges are each spaced ¾ of an inch from the centerline indicia of the hand tool and extend parallel to one another.

6. The hand tool according to claim 3, wherein the hand tool includes a second tab pair which each have longitudinal inner edges spaced about 0.875 inches from the centerline indicia and also have longitudinal outer edges spaced about 1.156 inches from the centerline indicia.

7. The hand tool according to claim 6, wherein the hand tool includes a third tab pair which each have longitudinal inner edges spaced about 1.25 inches from the centerline indicia and also have longitudinal outer edges spaced about 2.0 inches from the centerline indicia.

8. The hand tool according to claim 7, wherein the hand tool includes a fourth tab pair which each have longitudinal inner edges spaced about 1.75 inches from the centerline indicia and also have longitudinal outer edges spaced about 2.0 inches from the centerline indicia.

9. The hand tool according to claim 8, wherein the hand tool includes a fifth tab pair which each have longitudinal inner edges spaced about 2.25 inches from the centerline indicia and also have longitudinal outer edges spaced about 2.563 inches from the centerline indicia.

10. The hand tool according to claim 9, wherein the hand tool includes a sixth tab pair which each have longitudinal inner edges spaced about 2.75 inches from the centerline indicia and also have longitudinal outer edges spaced about 3.5 inches from the centerline indicia.

11. The hand tool according to claim 1, wherein the hand tool generally has a T-shaped transverse cross-sectional profile and has a length of about 7 inches and a width of about 3 inches.

12. The hand tool according to claim 1, wherein the hand tool generally has a L-shaped transverse cross-sectional profile and has a length of about 7 inches and a width of about 3 inches.

13. A hand tool comprising:
    a longitudinal alignment edge for facilitating alignment of the hand tool with an edge of a sheathing;
    a measurement plate extending normal to the alignment edge;
    at least one of the alignment edge and the measurement plate containing indicia indicating a centerline of the hand tool;
    the measurement plate having a plurality of pairs of marking edges to facilitate marking of a pair of alignment lines for use in aligning a framing member between the alignment lines during installation of the sheathing, the plurality of pairs of marking edges are parallel to each other and the centerline of the hand tool, the plurality of pairs of marking edges and the centerline of the hand tool extend normal to the alignment edge; and
    marking edges of each of the plurality of pairs of marking edges are equally spaced from the centerline and the spacing of the marking edges of each of the plurality of pairs of marking edges from the centerline is different from the spacing of the marking edges of the other pairs of marking edges.

14. The hand tool according to claim 13, wherein the marking edges of a first pair of marking edges are spaced from the centerline by a first distance and the marking edges of a second pair of marking edges are spaced from the centerline by a second distance and the first and the second distances are different from each other.

15. The hand tool according to claim 14, wherein the marking edges of a third pair of marking edges are spaced from the centerline by a third distance and the marking edges of a fourth pair of marking edges are spaced from the centerline by a fourth distance and the first, the second, the third and the fourth distances are different from each other.

16. The hand tool according to claim 15, wherein the first distance from the centerline to the first pair of marking edges is 1½ inches.

17. The hand tool according to claim 16, wherein the second distance from the centerline to the second pair of marking edges is 1¾ inches.

18. The hand tool according to claim 13, wherein the measurement plate contains the indicia indicating the centerline of the hand tool and the measurement plate comprises a viewing means for viewing the edge of the sheathing to facilitate alignment of the centerline of the hand tool with a marking inscribed on the edge of the sheathing.

19. The hand tool according to claim 13, wherein the hand tool generally has a T-shaped transverse cross-sectional profile.

20. A hand tool comprising:
a longitudinal alignment plate having a face which abuts an edge of a sheathing and facilitates alignment of the hand tool with the edge of the sheathing;

a measurement plate being integral with extending normal to the alignment plate;

at least one of the alignment plate and the measurement plate containing indicia centrally located between longitudinal ends of the alignment plate, the indicia extends normal to the alignment plate and defines a centerline of the hand tool; and the measurement plate having a plurality of marking edge pairs, marking edges of each of the plurality of marking edge pairs are parallel to each other and the centerline of the hand tool, the centerline of the hand tool is centrally located between the marking edges of each of the plurality of marking edge pairs such that the marking edges of each of the plurality of marking edge pairs define a corresponding width with the centerline being located at half of the width of corresponding marking edge pairs, the marking edges of each of the plurality of marking edge pairs facilitate delineating a pair of alignment lines for use in aligning a framing member between the alignment lines during installation of the sheathing.

* * * * *